US009041238B2

(12) United States Patent
McMahon

(10) Patent No.: US 9,041,238 B2
(45) Date of Patent: May 26, 2015

(54) VARIABLE WING VENTURI GENERATOR

(71) Applicant: Ned McMahon, San Diego, CA (US)

(72) Inventor: Ned McMahon, San Diego, CA (US)

( * ) Notice: Subject to any disclaimer, the term of this patent is extended or adjusted under 35 U.S.C. 154(b) by 131 days.

(21) Appl. No.: 13/875,125

(22) Filed: May 1, 2013

(65) Prior Publication Data
US 2014/0217740 A1    Aug. 7, 2014

Related U.S. Application Data

(60) Provisional application No. 61/761,184, filed on Feb. 5, 2013.

(51) Int. Cl.
*F03D 9/00* (2006.01)
*H02P 9/04* (2006.01)
*F03D 3/04* (2006.01)
*F03D 3/00* (2006.01)

(52) U.S. Cl.
CPC .............. *F03D 3/0418* (2013.01); *F03D 3/002* (2013.01); *F05B 2240/133* (2013.01); *F05B 2240/9112* (2013.01); *Y02B 10/30* (2013.01); *Y02E 10/74* (2013.01); *Y02E 10/728* (2013.01)

(58) Field of Classification Search
CPC . Y02E 10/70; F05B 2240/21; F05B 2240/24; F05B 2240/90; F03D 7/00; F03D 1/04; F03D 11/04; F03D 3/0409; B60K 16/00; B60K 2016/006; B60L 8/006; B60L 8/00; H02J 3/386; H02P 2009/004; G05B 2219/2619; E02B 2017/0091; Y02B 10/30; H02K 7/183
USPC ................ 290/44, 55; 415/213.1; 416/197 A; D13/115; 52/198, 302.1, 90.1, 90.2
See application file for complete search history.

(56) References Cited

U.S. PATENT DOCUMENTS

| 3,339,078 | A | * | 8/1967 | Crompton | ........................ 290/44 |
| 3,740,565 | A | * | 6/1973 | Wesley | ............................ 290/55 |
| 3,883,750 | A | * | 5/1975 | Uzzell, Jr. | ........................ 290/55 |
| 4,012,163 | A | * | 3/1977 | Baumgartner et al. | ..... 415/208.3 |
| 4,088,419 | A | * | 5/1978 | Hope et al. | ...................... 415/4.4 |
| 4,134,469 | A | * | 1/1979 | Davis | ............................. 180/2.2 |
| 4,140,433 | A | * | 2/1979 | Eckel | ......................... 415/209.1 |
| 4,163,904 | A | * | 8/1979 | Skendrovic | ..................... 290/54 |
| 4,218,175 | A | * | 8/1980 | Carpenter | .................. 415/219.1 |
| 4,411,588 | A | * | 10/1983 | Currah, Jr. | ..................... 415/220 |
| 4,415,306 | A | * | 11/1983 | Cobden | .......................... 415/4.5 |
| 4,424,452 | A | * | 1/1984 | Francis | ............................ 290/55 |
| 4,524,285 | A | * | 6/1985 | Rauch | ............................. 290/43 |
| 4,600,360 | A | * | 7/1986 | Quarterman | .................. 415/148 |
| 4,781,522 | A | * | 11/1988 | Wolfram | ............................ 415/1 |
| 4,868,408 | A | * | 9/1989 | Hesh | .............................. 290/52 |
| 4,890,976 | A | | 1/1990 | Jansson | |

(Continued)

FOREIGN PATENT DOCUMENTS

CA    WO 2006007696         1/2006
WO    WO 2011035415 A1 *   3/2011

*Primary Examiner* — Tulsidas C Patel
*Assistant Examiner* — Charles Reid, Jr.
(74) *Attorney, Agent, or Firm* — Mark Wisnosky

(57) ABSTRACT

A variable wing venturi generator and a housing for the same are presented. The wings are variable in that their relative position may be changed and optimized to maximize airflow through a turbine and generator contained between the wings. The invention allows for improved efficiency in wind generation. The device accelerates wind speed between a pair of adjustable venturi wings and is especially suited for low wind conditions.

16 Claims, 10 Drawing Sheets

(56) References Cited

U.S. PATENT DOCUMENTS

| | | | |
|---|---|---|---|
| 5,280,827 A * | 1/1994 | Taylor et al. | 180/165 |
| 5,375,968 A | 12/1994 | Kollitz et al. | |
| 5,381,048 A * | 1/1995 | Baird | 290/55 |
| 5,799,680 A * | 9/1998 | Dorflinger | 135/96 |
| 6,132,181 A * | 10/2000 | McCabe | 417/334 |
| 6,448,669 B1 * | 9/2002 | Elder | 290/54 |
| 7,112,034 B2 | 9/2006 | Bezemer | |
| 7,276,809 B2 | 10/2007 | Zambrano et al. | |
| D558,669 S | 1/2008 | Jeamvigite | |
| 7,315,093 B2 | 1/2008 | Graham, Sr. | |
| 7,354,245 B2 * | 4/2008 | Baba | 415/4.1 |
| 7,994,652 B2 | 8/2011 | Grabau et al. | |
| 8,338,974 B2 | 12/2012 | Nyffenegger | |
| 2002/0040555 A1 | 4/2002 | Banks et al. | |
| 2004/0061337 A1 | 4/2004 | Becker | |
| 2005/0006904 A1 | 1/2005 | Bayer | |
| 2005/0242590 A1 | 11/2005 | Zambrano et al. | |
| 2006/0108809 A1 | 5/2006 | Sealzi | |
| 2007/0018462 A1 | 1/2007 | Richards et al. | |
| 2008/0093861 A1 * | 4/2008 | Friesth et al. | 290/55 |
| 2008/0303287 A1 * | 12/2008 | Meheen | 290/55 |
| 2009/0066090 A1 * | 3/2009 | Boone | 290/55 |
| 2009/0095867 A1 * | 4/2009 | Oh et al. | 248/371 |
| 2009/0191057 A1 | 7/2009 | Knutson | |
| 2010/0090605 A1 * | 4/2010 | Nevins | 315/159 |
| 2010/0126086 A1 | 5/2010 | Paggi | |
| 2010/0207389 A1 * | 8/2010 | Nyffenegger | 290/44 |
| 2011/0031043 A1 * | 2/2011 | Armani et al. | 180/2.2 |
| 2011/0309723 A1 * | 12/2011 | Lu et al. | 310/339 |
| 2012/0043761 A1 | 2/2012 | White | |
| 2012/0175882 A1 | 7/2012 | Sterling et al. | |

* cited by examiner

VARIABLE WING VENTURI GENERATOR

CROSS-REFERENCE TO RELATED APPLICATIONS

This application claims priority to U.S. Provisional application 61/761,184, entitled Variable Wing Venturi Generator, filed on 5 Feb. 2013 by the same inventor.

BACKGROUND OF THE INVENTION

1. Technical Field

The present invention relates to a variable wing venturi useful in wind power generators.

2. Related Background Art

Wind power generators are well known. However large-scale wind generators are limited to regions with consistent strong winds. The size of the generators precludes their location in populated areas. Because of the need for exposure to the wind these generators typically having moving blades that capture the wind that are hazards to people or animals that encounter the blades. There are many situations where a local power source may be required to keep a system battery charged. Solar power is frequently used successfully in the applications. However there are many locations where the size of the required solar panel or the exposure to the sun precludes use of solar panels. Solar generation during night is obviously precluded. Solar panels mostly require installation on the roof area of buildings. This leave valuable vertical space of building walls untapped as an area to place power-generating devices. There has been much progress in the design of turbine blades and generators that, in combination with the right wind conditions, can rival and often surpass the power output of a solar installation of equivalent geometric size. The use of small scale generators that can be located closer to the point of the power consumption are limited because of the lack of consistent strong winds in populated areas. There is a need for improvements in wind generators that are compact in size and can operate efficiently with lower wind speeds. There is a need for a wind powered generator system that is self-contained and therefore safe from human and animal contact. There is a need for wind-powered generator that can be adjusted to account for varying wind speeds. There is a need for improved wind generator designs that enable smaller footprints and weight and can operate in both vertical and horizontal positions.

DISCLOSURE OF THE INVENTION

The present invention addresses the deficiencies discussed above related to wind generator designs. It is known that when a fluid passes through a constricted space, the fluid speed through that constricted space or venturi is accelerated and the pressure in this zone is reduced. This is the venturi effect. In the present invention a pair of wings are positioned to create the effect. The combination of a pair of surfaces where the space between the surfaces is tapered to create a venturi effect is defined herein as a venturi device, a wing venturi or simply a venturi. Wind enters at one end and flows through a constriction and accelerates. The accelerated wind speed will be some multiple of the natural wind speed based on the position of the venturi generator relative to the wind direction and the distance between the opening where the wind enters as compared to the distance at the exit. In one embodiment a venturi device is made of a pair of wing like surfaces that are used to increased wind speed and improve the efficiency of a wind generator located between those surfaces. In another embodiment the surfaces can be moved relative to one another. They can be adjusted for varying wind conditions in much the same way the jib and main sails on a boat are adjusted for changing wind conditions. The invention presents a means of increasing a given natural wind speed by passing the natural wind through an adjustable or variable wing shape creating a venturi. Embodiments are presented where this device can be mounted horizontally at the apex of a roof or at the edge of a roof and also vertically mounted as on the surface of a building. The device may be made as one continuous large wing housing a plurality of generators or can also be an array of stand alone generators, both enabling larger wind energy turbine applications.

The variable wing venturi described here make wind turbines for energy purposes more efficient by accelerating the wind such that low wind areas that normally are not in an area producing efficient wind speed for wind turbine energy production can now have that natural wind speed increased through the venturi thereby making wind energy turbines more efficient even in normally low wind areas.

Another embodiment provides a variable wing venturi for use in various wind turbine energy applications. Particularly suited to smaller residential or individual commercial low rise or high rise buildings, these variable wing venturis however can be set up in a series for bigger community or wind farm applications as well.

In one embodiment, the variable wing venturi is comprised of two wing type foils placed one above the other in a horizontal installation. The wing on top will be slightly larger than the bottom wing so that it is placed slightly ahead of the lower wing but is a size that allows for the trailing edge to be overlapping the bottom wing.

In another embodiment a vertical design the larger wing can be placed on either side of the smaller wing with the same type of overlap of the wings. The distance between the two leading edges of the wings will be greater than the distance between the two trailing edges thereby creating a venturi and accelerating the air flow that passes through the two wings so that the speed at the trailing edge of the wings is some multiple of the speed entering between the wings. The actual distance between the two foils will vary with the overall size and location of the variable wing venturi.

In another embodiment the foils will also have an adjusting mechanism that can vary the distance of the two trailing edges of the two wings allowing for some adjustable control to the multiplied wind speed. In one embodiment the spacing of the wings is tuned during operation to optimize the efficiency of the generator. In another embodiment the wings can be adjusted to shut down the generator if required for safety. In another embodiment the adjustment of the wing is computer controlled. In another embodiment the position of the wing is adjusted on the basis of the output of the generator. It is therefore the general object of the invention to make wind energy turbines more efficient by causing the natural wind speed passing through a variable wing venturi that can be adjusted or varied to increase as the natural wind passes through the variable wing venturi.

It is a further object of this invention to be made in various sizes to range from residential sizes where the variable wing venturi can be placed along the ridgeline of a house roof. This is a low profile variable wing venturi and can hold one or more energy producing turbines if the overall length allows for multiple turbines.

Additionally these variable wing venturis can be placed along the prevailing windward side of both low rise and high-rise commercial buildings. These variable wing venturis will not only accelerate natural wind but wind that results as an updraft along the side of the building as well.

Another object of the invention would be to place these variable wing venturis in series to make for a larger size in current wind farm type setting with several units per mounting pole. This will facilitate a more efficient use of the wind farm's acreage and servicing and installation of the turbine units and internal wind blades will be far easier than conventional methods.

In another embodiment all moving parts and the generator are enclosed within the wings of the venturi and walls attached at the edges of the wings. Thereby making a completely self-enclosed device protecting humans and animals from moving parts.

In accordance with the invention, these and other objectives are achieved by providing a variable wing venturi to accelerate natural wind speed to a greater multiple of that natural wind speed to allow for more efficient wind turbine energy production.

Although the disclosed invention may have broad applicability, it relates primarily to making wind turbine energy production more efficient by accelerating natural wind speed through a variable wing venturi to produce a greater multiple of the natural wind speed such that wind turbines for energy production will be more effective.

MODES FOR CARRYING OUT THE INVENTION

Figure 1:
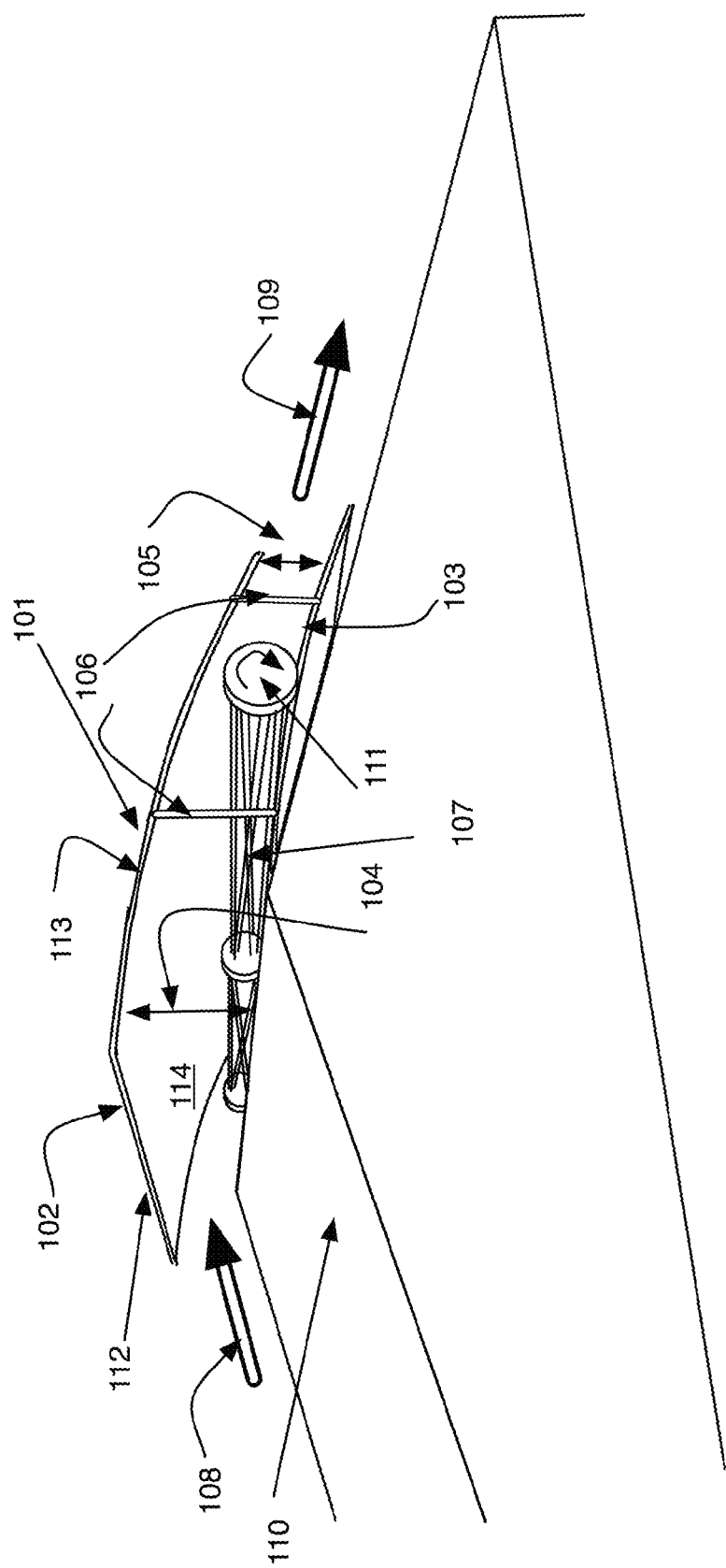
FIG. 1 is an image of a first embodiment placed at the apex of a sloped building roof.

Referring now to FIG. 1, a venturi wing generating device 101 is comprised of a top wing 102 and a bottom wing 103. The wings are rectilinear plane surfaces, having a top surfaces (not visible in the perspective shown, a bottom surface 114, a front or leading edge 112, a rear or trailing edge (not visible in the view shown) and two side edges 113 (only one edge visible in the perspective shown). The front 112 and rear edge surfaces are straight. The plane is curved from front to back resulting in the edges being slightly curved from horizontal as shown. The curvature of the surface creates a wing like structure. The distance 104 between the wings at the front edge 112 is seen to be larger than the distance 105 between the wings at the rear edge. The front or leading edge 112 is that edge where wind 108 enters the device and the rear edge (not visible in the figure) is where it air exits 109 the device. The wings are held apart by struts 106. The size of the struts is selected to control the spacing of the distances 104, 105 between the wings 102, 103. In embodiments shown later the struts are automatically adjustable. Between the struts is a rotating vane or turbine 107 that rotates with airflow between the wings 102, 103. The rotating vane or turbine shown here is comprised of a set of helical airfoil blades that cause the turbine to rotate about its long axis in the direction 111 as shown. The entire device 101 is mounted at the apex of a building roof 110. In another embodiment, not shown the lower wing 103 is removed and the surface of the roof under which the device 101 is mounted acts as one of the wings and the venturi is generated by spacing between the top wing 102 and the roof surface. The turbine 107 is attached to a generator (not shown) thus generating electrical power from the airflow through the device 101. In another embodiment (not shown) the wind vane may be mechanically linked such as through belts and pulleys to drive a mechanical device such as water pump, oil well pump, air circulating fan, etc. In another embodiment the entire structure 101 is mounted such that it may be rotated to adjust for varying directions 108 for the incoming wind.

Figures 2A, 2B:
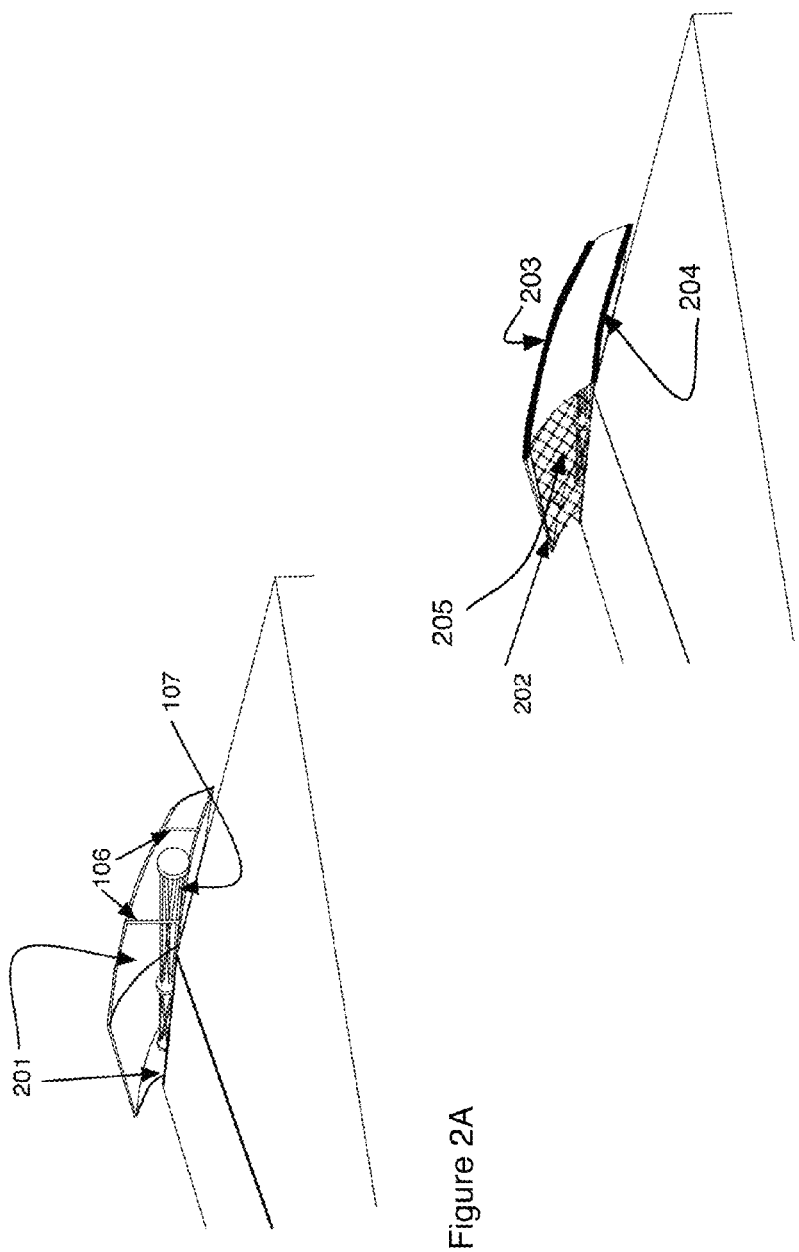
FIGS. 2A and 2B are images of a second embodiment showing side enclosures on the device.

Referring to FIGS. 2A and 2B the positioning of side enclosures 201 is shown. The side enclosures may be of rigid material such as fiberglass reinforced plastic (FRP) or may be made of a flexible material. In one embodiment the sidewalls are attached to the edge 204 of the bottom plane and not attached to the edge 203 of the top plane thus allowing the top and bottom surfaces to be moved relative to one another while still enclosing the inner parts of the generator. In another embodiment the distance between the planes is adjusted in response to changes in wind conditions. In another embodiment the sidewalls are attached at both the top edge 203 and the bottom edge 204. In another embodiment the sidewalls are attached at both edges and the sidewalls are made of a flexible material that allows the relative position of the planes to be adjusted in response to changing wind conditions while still enclosing the inner workings of the generator. In another embodiment the sidewalls are made of rigid material and the top plane and bottom plane are affixed to the sidewalls at the edges 203, 204 thereby providing a fixed enclosed space for the generator. The sidewalls are located at the side edges of the rectilinear planes and form a rectangular space 205 enclosed on four sides with openings at either end to allow airflow through the rectangular space. Also seen in FIG. 2B is another embodiment including a screen 202 that protects the front entrance to the device. This would thereby provide a measure of safety for humans and animals in the region of the devices as the moving parts such as the turbines 107 are fully enclosed.

Figure 3A:
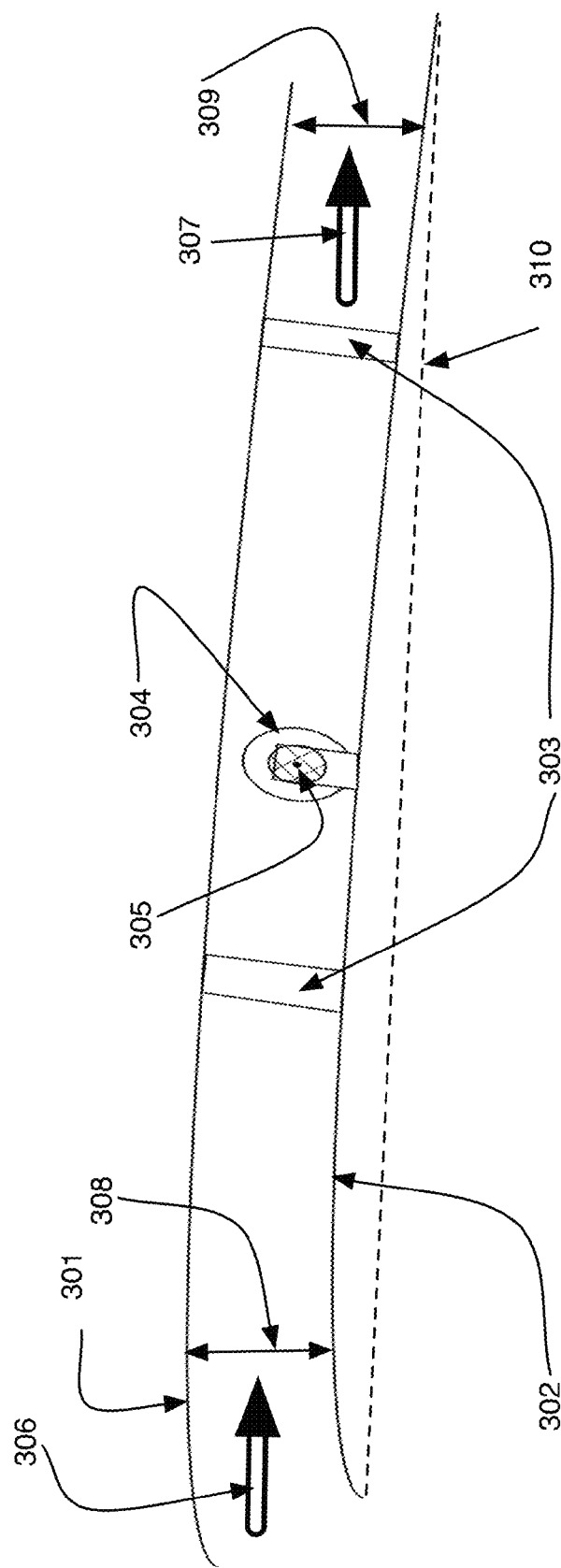
FIG. 3A is side view of the embodiment of FIG. 1.

The embodiment of FIG. 1 is further illustrated in the edge view of FIG. 3A. The variable wing venturi generator is comprised of a top surface 301 and a bottom surface 302. The surfaces 301, 302 are held apart by struts 303. In a preferred embodiment the struts are adjustable such that the distances 308, 309 between the surfaces may be adjusted. The wind direction is shown with the large arrows 306, 307. In the preferred embodiment the distance 308 is larger than the distance 309 and the velocity of the wind at the exit 307 is greater than the velocity of the wind at the entrance 306. The device further includes a rotating vane or turbine 304 the rotating shaft of which is attached to a generator 305 such that when wind flows through the device the turbine rotates and generates electricity. In another embodiment the device is comprised of a housing only. The housing is comprised of a top surface 301 and a bottom surface 302 the surfaces separated and held apart by struts 303. The struts are used to adjust the distance between the surfaces such that the flow of fluid moving through the device has a velocity at the exit of the device 307 that is greater than the velocity at the entrance 306. In the preferred embodiment the fluid flowing through the device is air and the housing is used for a wind generator. A horizontal reference line 310 is included to show the curvature of the rectilinear surfaces comprising the top and bottom surface.

Figure 3B:
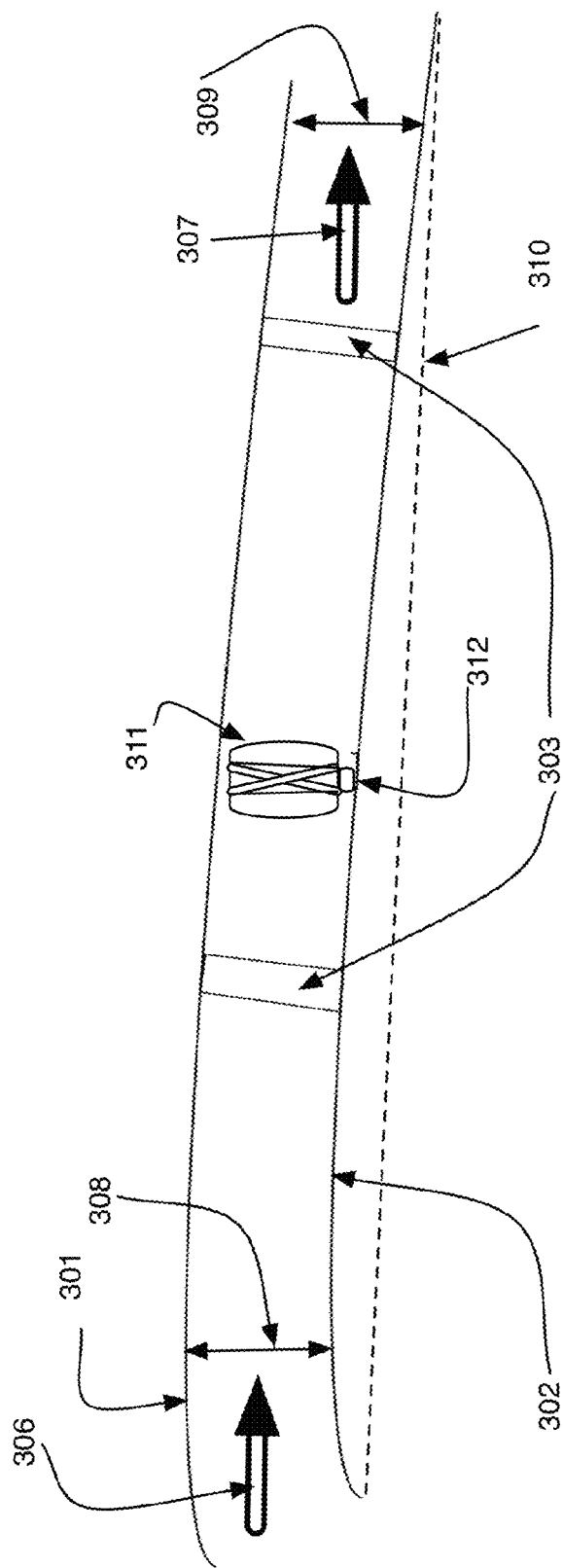
FIG. 3B is a side view of a modified embodiment.

In another embodiment shown in FIG. 3B the turbine 311 is in a vertical position with the generator 312 attached to one or both ends of the turbine 311. In another embodiment a plurality of generators 312 are located between the top 301 and bottom 302 surfaces. Other features in FIG. 3B are as already discussed in conjunction with FIG. 3A.

Figure 4:
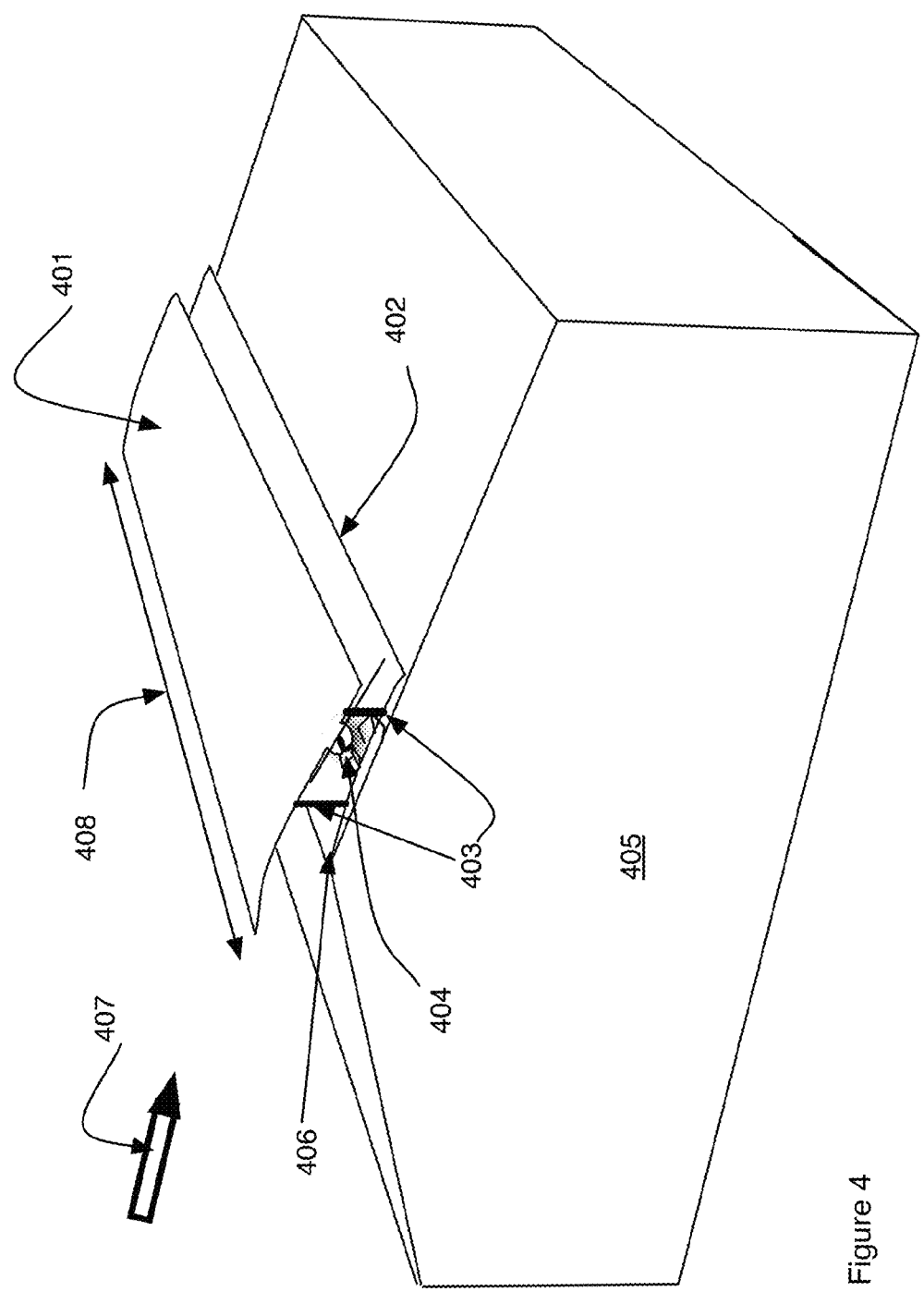
FIG. 4 is an image of an embodiment where the device is extended across the entire roofline of a building and may include a plurality of generators.

In FIG. 4 the variable wing venturi 401 is placed along a roof's ridgeline 406 on a building 405. In the embodiment shown, the top wing 403 extends forward of the ridgeline 406 into the direction of the natural prevailing wind 407 while the lower wing 402 is mounted such that its leading edge aligns with the ridgeline 406 of the building 405. The wind energy rotating vane or turbine 404 can be placed for the entire length of the ridgeline in this variable wing venturi application. The device of FIG. 4 may include a single turbine and generator that traverses the entire ridgeline length 408 or a plurality of turbines and generators.

Figure 5:
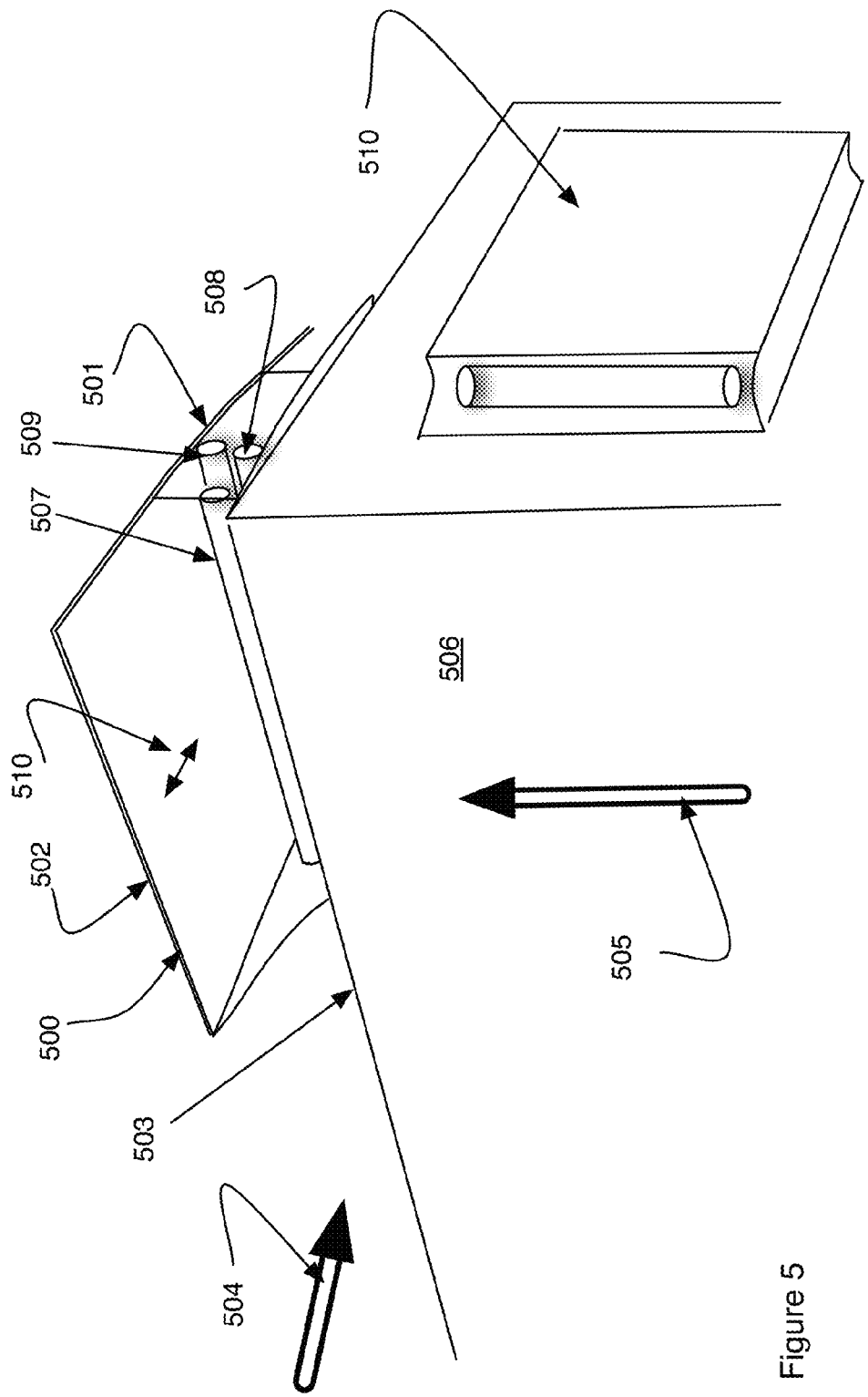
FIG. 5 is an image of the device used at the edge of a roof and also an embodiment placed on the vertical wall of a building.

FIG. 5 shows additional embodiments where the variable wing venturi generators are mounted at the edge of the roof or vertically on the wall of a building 506. In a first instance the device 500 is mounted horizontally but located at the roof edge of the building where the top wing 501 extends beyond the edge 503 of the roofline. The device is located to face into the direction 504 of the prevailing wind. Prevailing wind in the direction as shown will also create an updraft 505 along the vertical wall of the building 506. The device 500 is positioned such that the top wing 501 can capture this updraft and direct it through the generator thereby increasing its efficiency. In the embodiment shown the venturi generator 500 is seen to include a plurality 507, 508, 509 of rotating vane or turbine generators. In one embodiment the turbines 507, 508 are located parallel to another and displaced along the axis 510 that is perpendicular to the leading edge 502 of the top wing. In another embodiment the turbine generators 508, 509 are located one above within the enclosure of the variable wing venturi generator 500.

In another embodiment the variable wing venturi generator 510 is rotated 90 degrees and mounted on a vertical wall of the building.

Figure 6:
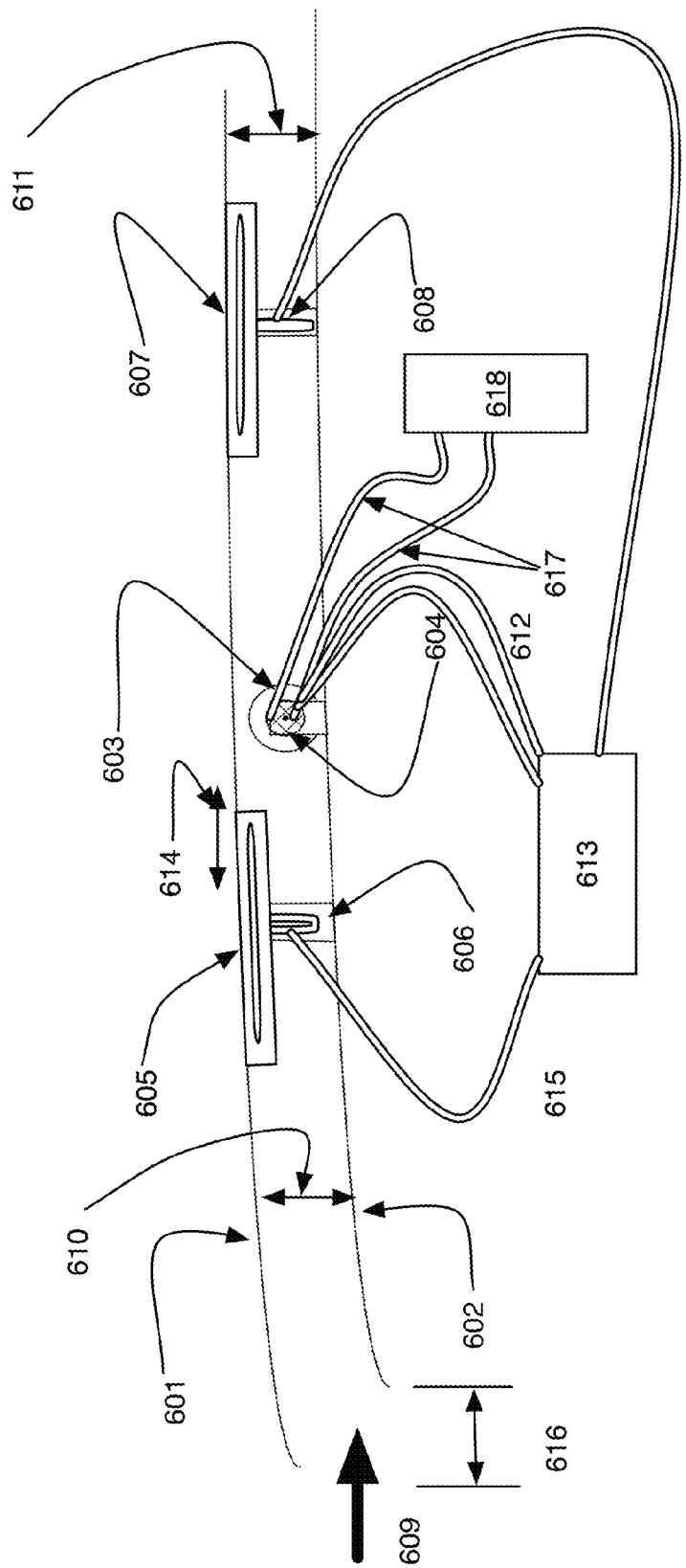
FIG. 6 is a diagram of components for an embodiment that includes automatic control.

Referring now to FIG. 6, a side view of an embodiment of the invention is shown. The generating device is comprised of a top wing 601 and a bottom wing 602. The wings are held relative to one another by adjustable brackets 605, 606, 607, 608. The brackets as shown allow for adjustment of the vertical distances 610, 611 between the wings through brackets 606, 608 and adjustment of the relative horizontal position 614 of the wings relative to one another via brackets 605, 607. Adjustment of the horizontal position 614 affects the relative overlap 616 of the two wings. In one embodiment the brackets 605, 606, 607 and 608 are motorized and can therefore be computer controlled. Further the brackets 606, 608 may be adjusted independently such that the distance 610 at the leading edge may be adjusted relative to the distance 611 at the trailing edge thus affecting the taper of the venturi device created by the wings 601, 602. The device further includes at least one rotating vane or turbine 603 that rotates as a result of wind 609 flowing through the gap between the wings. In the example shown the turbine turns a generator 604 to generate electricity. In another embodiment, not shown, the turbine is used to power a mechanical device. The output from the generator is connected by wires 617 to a load 618 to use the power generated. In another embodiment the output from the generator is also connected by wires 612 to a control device 613 that is in turn connected by wires 615 to motors on the adjustable brackets 605, 606, 607, 608 to control the geometry as already discussed. Details of the control device are discussed in conjunction with FIG. 8 below. Only exemplary connections are shown. In another embodiment the adjustable brackets 605, 606, 607, 608 are hydraulically activated and the controller 613 includes hydraulic controls and the connection wire 615 is replaced with a hydraulic line. Note that there are adjustable brackets on both sides of the pair of wings. In one embodiment all eight brackets (two horizontal and two vertical brackets on each side) may be independently controlled thereby enabling adjustment of not just the spacing 610, 611 but also the tilt of the wings relative to one another along the leading windward 609 edge. This adjustment provides additional optimization for variations in the wind direction.

In another embodiment, not shown the brackets 605, 606, 607, 608 are replaced by a single adjustable bracket to which the top wing is attached such that the single bracket can control the spacing between the wings at the leading edge. In another embodiment not shown a single adjustable bracket is located at the trailing edge of the wings.

Figure 7:
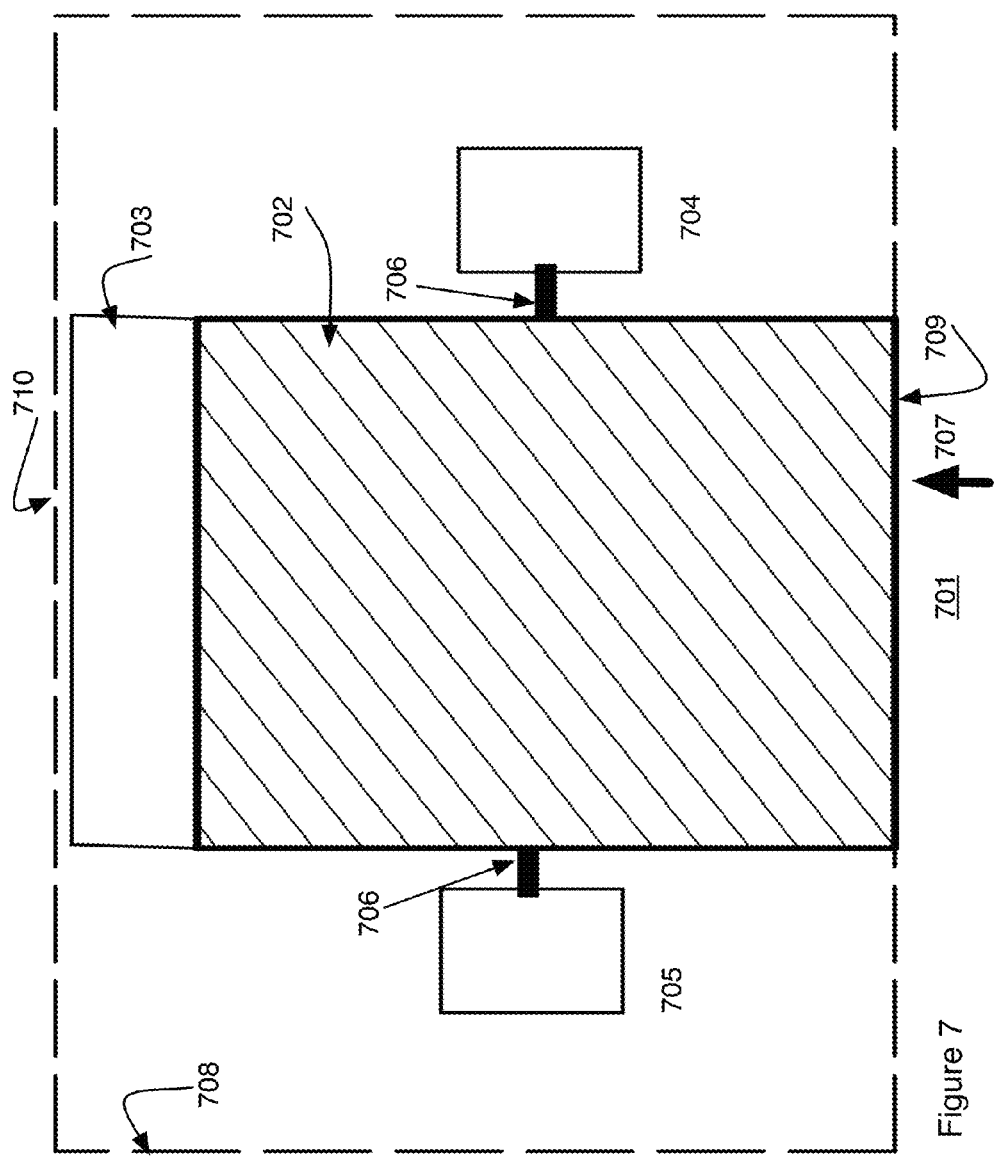
FIG. 7 is a top view of a self-enclosed embodiment that includes two generators.

Referring now to FIG. 7, a block diagram of a top view of an embodiment is shown. The generation device 701 is comprised of a top wing 702 and a bottom wing 703. Air flows 707 through the space between the wings to turn a turbine (not visible) located between the wings. The turbine rotates a shaft 706 that is connected to generators 704, 705. Note that this embodiment now includes a pair of generators attached to a single turbine. In another embodiment the device further includes a shell cover 708 that has openings at the front 709 and rear 710 ends to allow airflow through the wings and at the same time protecting all components from the weather.

Figure 8:
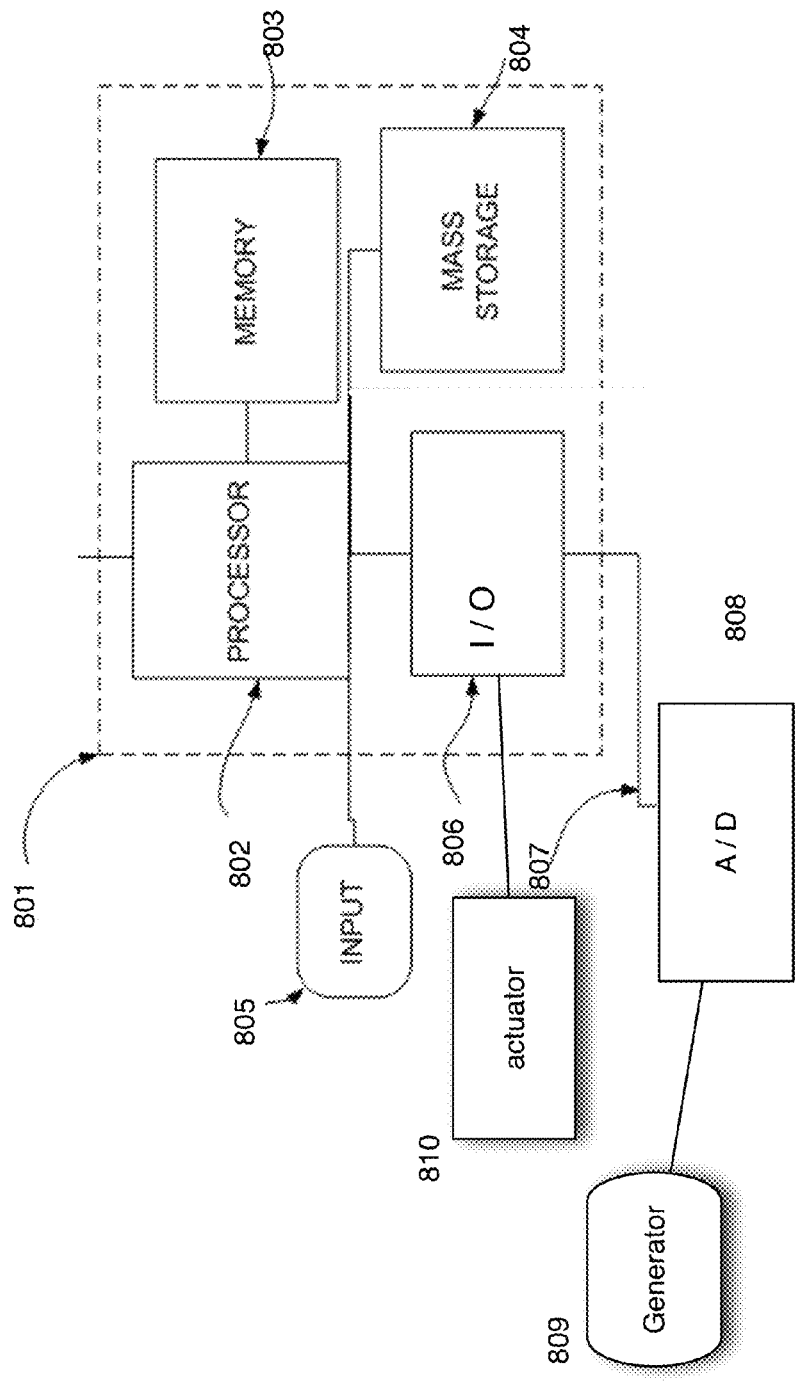
FIG. 8 is a block diagram of a computing and actuator system suitable to automatically control the geometry of the venturi generating wings.

Referring to FIG. 8, a control system embodiment is shown. The control system is comprised of a computing device 801 that in turns includes a processor 802, memory 803, mass storage 804, input/output ports 806 and a means 805 for inputting programs and controlling the computer 801. The output from the generator 809 is connected to an analog to digital converter 808 that is connected by wire connection 807 and provides a digital signal to the I/O of the computing device. The digital signal is proportional to the power output of the generator. The I/O of the computing device is also connected to an actuator 810 the actuator controlling the motorized support system for the wings such that the relative spacing and position of the wings may be controlled from the computing device. In one embodiment the computing device is programmed to provide closed loop control of the relative position of the two wings continuously maximizing the power output from the generator. In another embodiment the control system can shut down the generator and close the wings if the output of the generator exceeds a predetermined level indicating too high a wind speed and potential damage to the generating device.

Figure 9:
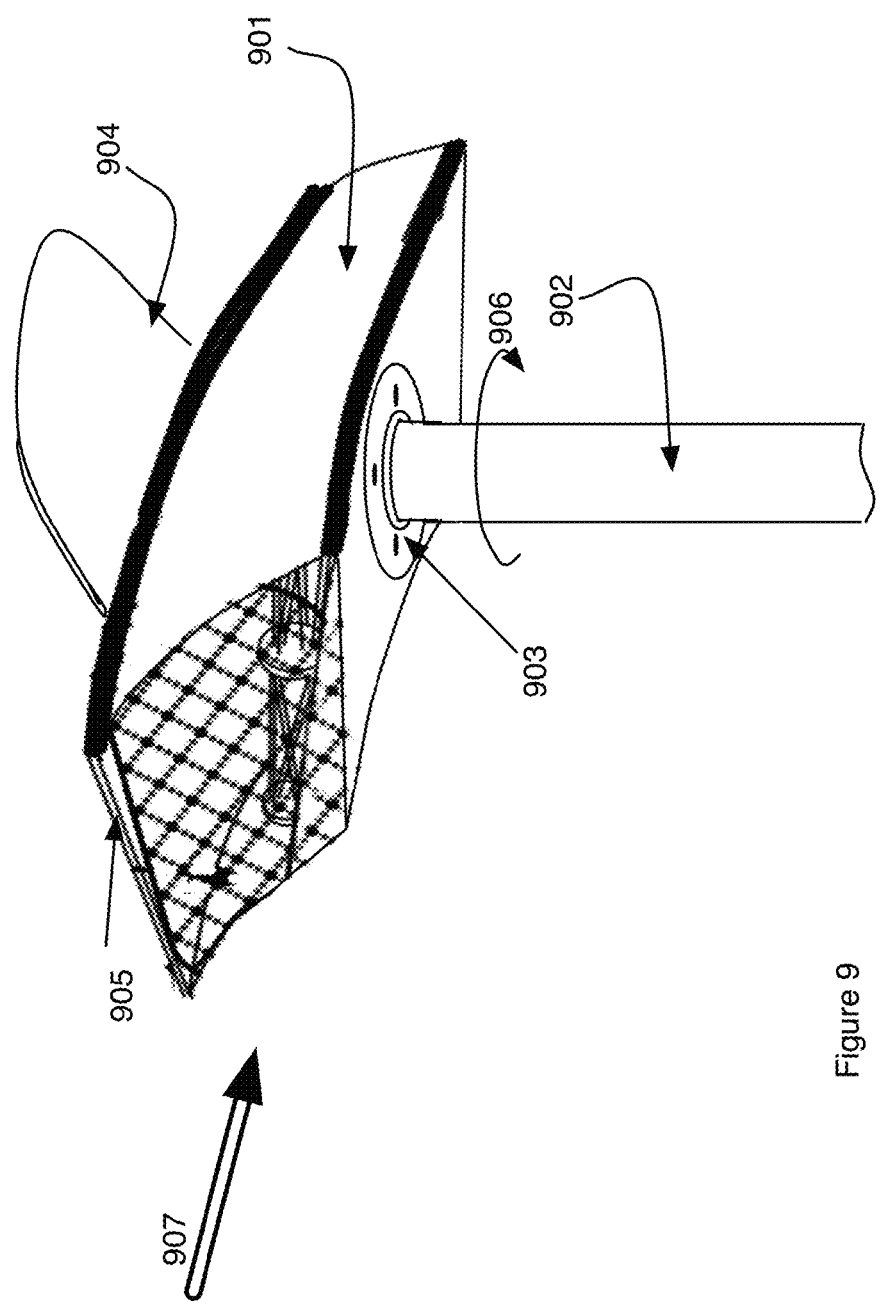
FIG. 9 is a view of a pole-mounted embodiment of the invention.

In other embodiments shown in FIG. 9, the variable wing venturi can be set up in a series for larger commercial wind farm applications. This wind farm commercial installation is different from the FIG. 3 installation or the building FIG. 4 installation, both of which have fixed positioning of the variable wing venturi to take a advantage of the most common prevailing wind conditions for a specific location. In this wind farm application the variable wing venturis 901 are placed on mounting poles 902. In one embodiment a single device is attached to a pole 902 via a base 903. The base 903 is capable of being rotating 906 about the axis of the pole 902. In another embodiment the top of the variable wing venturi further includes a top vane or rudder 904 that causes the device to rotate thus maintaining the leading edge 905 perpendicular to the wind direction 907. In another embodiment a plurality of such devices are mounted on a central support pole.

SUMMARY

A variable wing venturi generator is presented. The invention allows for improved efficiency in wind generation. The device accelerates wind speed between a pair of adjustable venturi wings and is especially suited for low wind conditions.

Those skilled in the art will appreciate that various adaptations and modifications of the preferred embodiments can be configured without departing from the scope and spirit of the invention. Therefore, it is to be understood that the invention may be practiced other than as specifically described herein, within the scope of the appended claims.

What is claimed is:

1. An wind powered electric generator comprising:
   a) a first rectilinear plane with a top surface, a bottom surface and a front edge, a rear edge and two side edges, the front and rear edges being straight and the rectilinear surface curved upward slightly such that the side edges are slightly curved from horizontal thereby forming a wing-like surface,
   b) a second rectilinear plane with a top surface, a bottom surface and a front edge, a rear edge and two side edges, the front and rear edges being straight and the rectilinear surface curved upward slightly such that the side edges are slightly curved from horizontal thereby forming a wing-like surface,
   c) The first rectilinear plane placed above and substantially overlapping the second rectilinear plane the planes held in position with brackets such that air can flow between the first rectilinear plane and the second rectilinear plane,
      wherein a space between the first rectilinear plane and the second rectilinear plane is larger at the front edges of the rectilinear planes than at the rear edges of the rectilinear planes, and,
   d) sidewalls that are located at the side edges of the rectilinear planes thereby forming a rectangular space enclosed on four sides with openings at either end to allow air flow through the rectangular space,
   e) a turbine located in the space between the first rectilinear plane and the second rectilinear plane and oriented such that the turbine rotates when air flows between the surfaces,
   f) an electric generator attached to the turbine such that the rotation of the turbine causes rotation of the shaft of the generator thereby producing electric power output from the generator.

2. The generator of claim 1 wherein the brackets are adjustable.

3. The generator of claim 1 further comprising a plurality of adjustable brackets located such that a distance between the first rectilinear plane and the second rectilinear plane may be adjusted and a plurality of brackets positioned so that the first rectilinear plane may be moved in a direction such that the overlap of the first rectilinear plane with the second rectilinear plane at the front and rear edges may be adjusted.

4. The generator of claim 2 wherein the adjustable brackets are motorized and under the control of a computing device said computing device connected through an analog to digital converter to the output of the generator and said computing device programmed to use closed loop control to maximize the output of the generator by adjusting a position of the adjustable brackets.

5. The generator of claim 3 wherein the adjustable brackets are motorized and under the control of a computing device said computing device connected through an analog to digital converter to the output of the generator and said computing device programmed to use closed loop control to maximize the output of the generator by adjusting a position of the adjustable brackets.

6. The generator of claim 1 further comprising a mount attached to the bottom surface of the second rectilinear plane and the mount capable of being attached to a supporting pole having an axis.

7. The generator of claim 6 wherein the mount may be rotated about an axis coincident with the axis of the pole thereby rotating the generator.

8. The generator of claim 7 further comprising a vane located on the top surface of the first rectilinear plane such that the vane causes the generator to rotate to orient the front edges of the rectilinear planes to face into the wind.

9. A housing for a wind powered electric generator said housing comprising:
   a) a first rectilinear plane with a top surface, a bottom surface and a front edge, a rear edge and two side edges, the front and rear edges being straight and the rectilinear surface curved upward slightly such that the side edges are slightly curved from horizontal thereby forming a wing-like surface,
   b) a second rectilinear plane with a top surface, a bottom surface and a front edge, a rear edge and two side edges, the front and rear edges being straight and the rectilinear surface curved upward slightly such that the side edges are slightly curved from horizontal thereby forming a wing-like surface,
   c) The first rectilinear plane placed above and substantially overlapping the second rectilinear plane the planes held in position with brackets such that air can flow between the first rectilinear plane and the second rectilinear plane,
      wherein a space between the first rectilinear plane and the second rectilinear plane is larger at the front edges of the rectilinear planes than at the rear edges of the rectilinear planes, and,
   d) sidewalls that are located at the side edges of the rectilinear planes thereby forming a rectangular space enclosed on four sides with openings at either end to allow air flow through the rectangular space.

10. The housing of claim 9 wherein the brackets are adjustable.

11. The housing of claim 9 further comprising a plurality of adjustable brackets located such that a distance between the first rectilinear plane and the second rectilinear plane may be adjusted and a plurality of brackets positioned so that the first rectilinear plane may be moved in a direction such that the overlap of the first rectilinear plane with the second rectilinear plane at the front and rear edges may be adjusted.

12. The housing of claim 10 wherein the adjustable brackets are motorized and under the control of a computing device said computing device connected through an analog to digital converter to an output of a generator located within the housing and said computing device programmed to use closed loop control to maximize the output of the generator by adjusting a position of the adjustable brackets.

13. The housing of claim 11 wherein the adjustable brackets are motorized and under the control of a computing device said computing device connected through an analog to digital converter to an output of a generator and said computing device programmed to use closed loop control to maximize the output of the generator by adjusting a position of the adjustable brackets.

14. The housing of claim 9 further comprising a mount attached to the bottom surface of the second rectilinear plane and the mount capable of being attached to a supporting pole having an axis.

15. The housing of claim 14 wherein the mount may be rotated about an axis coincident with the axis of the pole thereby rotating the housing.

16. The housing of claim 15 further comprising a vane located on the top surface of the first rectilinear plane such that the vane causes the housing to rotate to orient the front edges of the rectilinear planes to face into the wind.

* * * * *